(12) United States Patent
Atabey

(10) Patent No.: US 8,788,083 B2
(45) Date of Patent: Jul. 22, 2014

(54) COMPENSATION FOR PROCESS VARIABLES IN A NUMERICALLY-CONTROLLED MACHINING OPERATION

(75) Inventor: Fuat Atabey, Saint Lambert (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 439 days.

(21) Appl. No.: 13/188,604

(22) Filed: Jul. 22, 2011

(65) Prior Publication Data
US 2013/0024021 A1 Jan. 24, 2013

(51) Int. Cl.
G06F 19/00 (2011.01)

(52) U.S. Cl.
USPC ........... 700/175; 700/160; 700/174; 700/179; 700/184

(58) Field of Classification Search
USPC ......... 700/159–160, 163, 174–175, 179, 184, 700/187; 29/889.7–889.72
See application file for complete search history.

(56) References Cited

U.S. PATENT DOCUMENTS

| | | | |
|---|---|---|---|
| 3,890,062 A | 6/1975 | Hendrix et al. | |
| 4,078,195 A | 3/1978 | Mathias et al. | |
| 4,442,494 A | 4/1984 | Fromson et al. | |
| 4,559,600 A | 12/1985 | Rao | |
| 4,584,649 A | 4/1986 | Komanduri et al. | |
| 4,995,087 A * | 2/1991 | Rathi et al. | 382/152 |
| 5,021,941 A | 6/1991 | Ford et al. | |
| 5,170,103 A | 12/1992 | Rouch et al. | |
| 5,282,261 A | 1/1994 | Skeirik | |
| 5,286,947 A | 2/1994 | Clyde et al. | |
| 5,369,870 A | 12/1994 | Ouchi et al. | |
| 5,428,201 A | 6/1995 | Kaneko et al. | |
| 5,523,953 A | 6/1996 | Araie et al. | |
| 5,571,426 A | 11/1996 | Akemura | |
| 5,649,063 A | 7/1997 | Bose | |
| 5,664,066 A | 9/1997 | Sun et al. | |
| 5,831,407 A | 11/1998 | Ouchi et al. | |
| 5,957,016 A | 9/1999 | Segalman et al. | |
| 6,062,778 A | 5/2000 | Szuba et al. | |
| 6,189,426 B1 | 2/2001 | Segalman et al. | |
| 6,471,474 B1 * | 10/2002 | Mielke et al. | 415/199.4 |
| 6,478,539 B1 | 11/2002 | Trutschel | |
| 6,524,070 B1 * | 2/2003 | Carter | 416/193 A |
| 6,694,213 B2 | 2/2004 | Claesson et al. | |
| 6,850,874 B1 | 2/2005 | Higuerey et al. | |
| 6,905,310 B2 | 6/2005 | Kawamoto et al. | |
| 6,912,446 B2 * | 6/2005 | Wang et al. | 700/193 |
| 7,099,737 B2 | 8/2006 | Suh et al. | |
| 7,340,985 B2 | 3/2008 | Claesson et al. | |

(Continued)

FOREIGN PATENT DOCUMENTS

| | | |
|---|---|---|
| WO | 93/23820 | 11/1993 |
| WO | 2009/106830 | 9/2009 |

*Primary Examiner* — Ramesh Patel
(74) *Attorney, Agent, or Firm* — Norton Rose Fulbright Canada LLP

(57) ABSTRACT

A method of machining a work part in a numerically-controlled machining process with a selected tool, includes steps of inspecting actual geometric parameters of the selected tool and predicting cutting forces and this tool deflections based on given tool/part engagement conditions and pre-measured static stiffness of the selected tool, then modifying a tool path of the numerically-controlled machining process to compensate for the predicted tool deflections, and finally machining the work part to a desired profile by use of the selected tool to follow the modified tool path.

13 Claims, 3 Drawing Sheets

(56) References Cited

U.S. PATENT DOCUMENTS

| | | |
|---|---|---|
| 7,366,583 B2 | 4/2008 | Burgess et al. |
| 7,377,037 B2 | 5/2008 | Ouellette et al. |
| 7,472,478 B2 | 1/2009 | Graham et al. |
| 7,559,728 B2 | 7/2009 | Meier et al. |
| 7,634,854 B2 | 12/2009 | Meier |
| 7,637,010 B2 * | 12/2009 | Burgess et al. ............ 29/889.23 |
| 7,704,021 B2 | 4/2010 | Hollmann et al. |
| 7,730,813 B2 | 6/2010 | Schmitz et al. |
| 7,797,828 B2 * | 9/2010 | Beeson et al. ............ 29/888.021 |
| 7,810,417 B2 | 10/2010 | Onozuka et al. |
| 7,992,761 B2 | 8/2011 | Baumann et al. |
| 8,100,655 B2 * | 1/2012 | Stone et al. ............... 416/193 A |
| 8,103,375 B2 * | 1/2012 | Ouellette et al. .............. 700/186 |
| 2004/0083024 A1 * | 4/2004 | Wang ............................ 700/195 |
| 2005/0004684 A1 | 1/2005 | Cribbs |
| 2005/0133527 A1 * | 6/2005 | Dullea et al. ...................... 222/1 |
| 2006/0039792 A1 * | 2/2006 | Ferte et al. ..................... 416/232 |
| 2006/0090336 A1 * | 5/2006 | Graham et al. .............. 29/889.1 |
| 2007/0251072 A1 * | 11/2007 | Beeson et al. ............. 29/402.01 |
| 2008/0105094 A1 | 5/2008 | McMurtry et al. |
| 2008/0250659 A1 | 10/2008 | Bellerose et al. |
| 2009/0144980 A1 * | 6/2009 | Rangarajan et al. ......... 29/889.1 |
| 2009/0282680 A1 * | 11/2009 | Kappmeyer et al. ....... 29/889.23 |
| 2010/0023157 A1 | 1/2010 | Burgess et al. |
| 2010/0036519 A1 | 2/2010 | Yamada et al. |
| 2010/0161107 A1 | 6/2010 | Kappmeyer et al. |
| 2011/0180521 A1 | 7/2011 | Qiotter et al. |
| 2012/0138586 A1 | 6/2012 | Webster et al. |

* cited by examiner

COMPENSATION FOR PROCESS VARIABLES IN A NUMERICALLY-CONTROLLED MACHINING OPERATION

TECHNICAL FIELD

The described subject matter relates generally to compensation for process variables in a numerically-controlled machining operation, and more particularly to an improved method of airfoil machining resulting in improved machining quality of compressor parts of gas turbine engines by modifying numerically-controlled machining process off-line, based on process and machine variables.

BACKGROUND OF THE ART

Numerically-controlled in situ milling machines are known in the prior art for providing automated milling processes. Numerically-controlled milling machines are sometimes used for machining compressor parts of gas turbine engines such as fan blades, integrally bladed rotors or impellers, for example from a solid forging. Up to 90% of the mass of the solid forging is removed after long machining operations. Machining of long blades requires long tools to be used in all operations including roughing, semi-finishing and finishing. The tools deflect during machining operation due to their low bending stiffness and do not remove exact amounts of material as programmed. Cutting forces are proportional to the tool-and-part engagement conditions, which continuously change throughout a machining process of airfoils in five-degree-freedom operation such that the deflection of the tools and therefore remaining material on the blade surfaces, vary in every operation and for each individual blade. Dimensional variations within accepted tolerance ranges caused by eccentricity of the tool, holder and spindle and unbalance asymmetries in the tool shape, can further contribute to variations in tool engagement and deflection. All these factors lead to dimensional variations and a potentially significant mismatch between the machined section of the blades, which require extensive re-working after the machining process is completed. Re-working is a manual process and may cause dimensional deviations on the blades which affect the performance thereof Accordingly, there is a need to provide an improved numerically-controlled machining operation.

SUMMARY

In one aspect, the described subject matter provides a method machining an airfoil part in a numerically-controlled machining process with a selected tool, the numerically-controlled machining process being based on given tool-and-part engagement conditions, the method comprising a) inspecting actual geometric parameters of the selected tool; b) predicting cutting forces in a computing program based on the given tool-and-part engagement conditions and using the inspected actual geometric parameters of the selected tool as inputs; c) predicting tool deflections under the predicted cutting forces based on a pre-measured static stiffness of the selected tool; d) modifying a tool path of the numerically-controlled machining process to compensate for the predicted tool deflections; and e) machining the airfoil part to a desired profile by use of the selected tool to follow the modified tool path.

In another aspect, the described subject matter provides an airfoil machining system having a numerically-controlled machine tool, the airfoil machining system comprising a storage medium containing data of a static stiffness of a cutting tool mounted on a spindle of the machine tool and data of given tool-and-part engagement conditions in the sequence of the desired operational steps; a scanning apparatus for inspecting actual geometric parameters of the cutting tool, the scanning apparatus being operatively connected to the storage medium for sending data of the inspected actual geometric parameters of the cutting tool to the storage medium; a computing apparatus capable of predicting cutting forces and tool deflections in a sequence of desired operational steps of the machine tool, based on the data stored in the storage medium; and a numerically-controlled unit capable of controlling the machine tool in the sequence of the desired operational steps to provide a desired tool path.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

DETAILED DESCRIPTION

Figure 1:
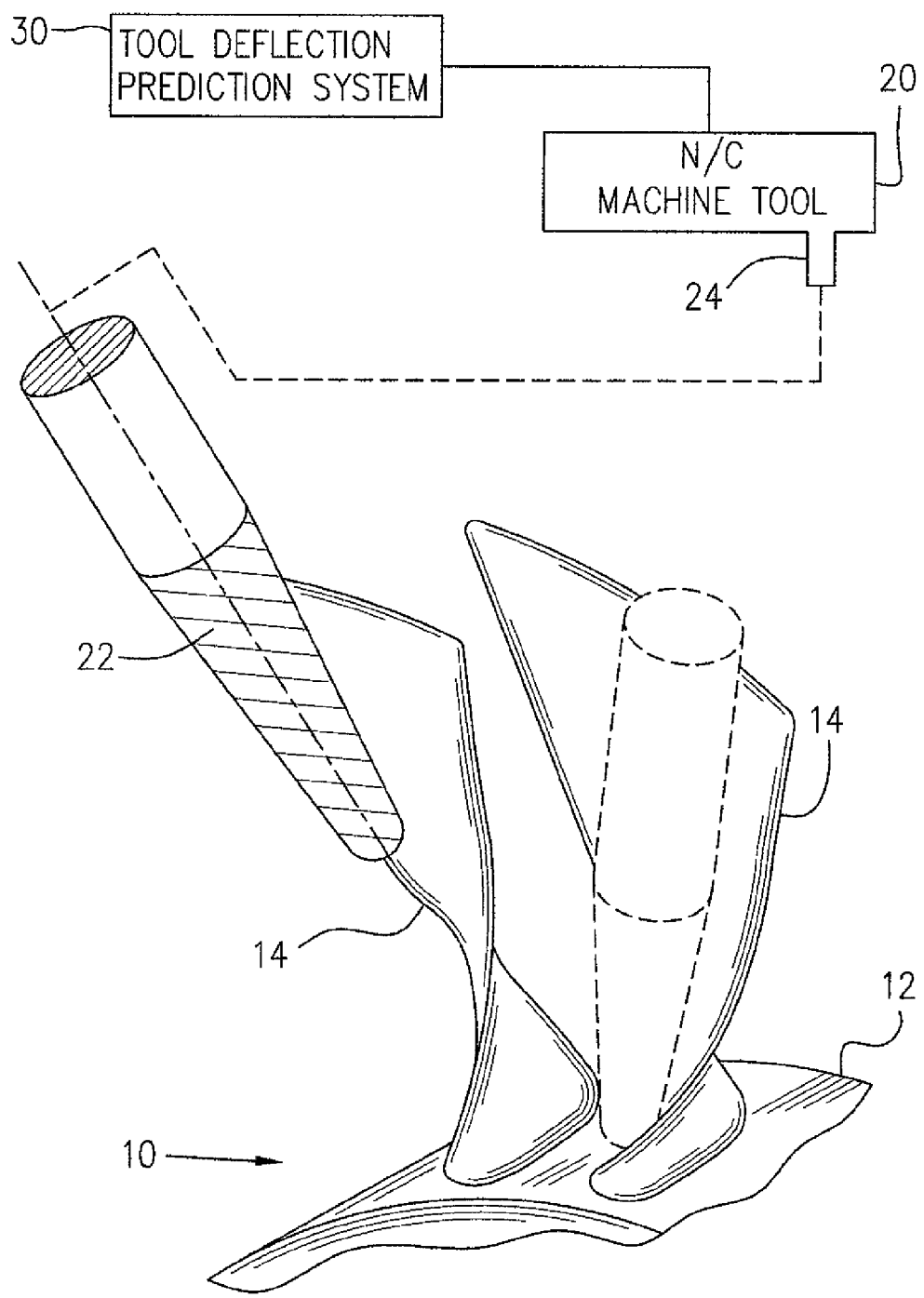
FIG. 1 is a partial perspective view of an integrally bladed rotor of a gas turbine engine being machined by a milling machine incorporating one embodiment of the described subject matter.

Referring to FIG. 1, an integrally bladed rotor 10 is taken as an example of a part to be machined by a numerically-controlled machine tool 20 which uses prediction data generated by a tool deflection prediction system 30 to off-line modify the numerically-controlled machining operation to be performed on the integrally bladed rotor 10. The integrally bladed rotor 10 includes a disk 12 with an array of blades 14 affixed to the periphery of the disk 12 (only part of the disk 12 and two blades 14 are shown). The blades 14 extend radially outwardly from the disk 12 and are circumferentially spaced apart one from another. The integrally bladed rotor 10 may be made from a solid forging block in a series of machining processes to remove up to 90% of the forging block material. A cutting tool 22 which is mounted to a rotating spindle 24 of the numerically-controlled machine tool 20, is shown in different positions with respect to the integrally bladed rotor 10, for example one position shown in solid lines and another shown in broken lines.

Figure 2:
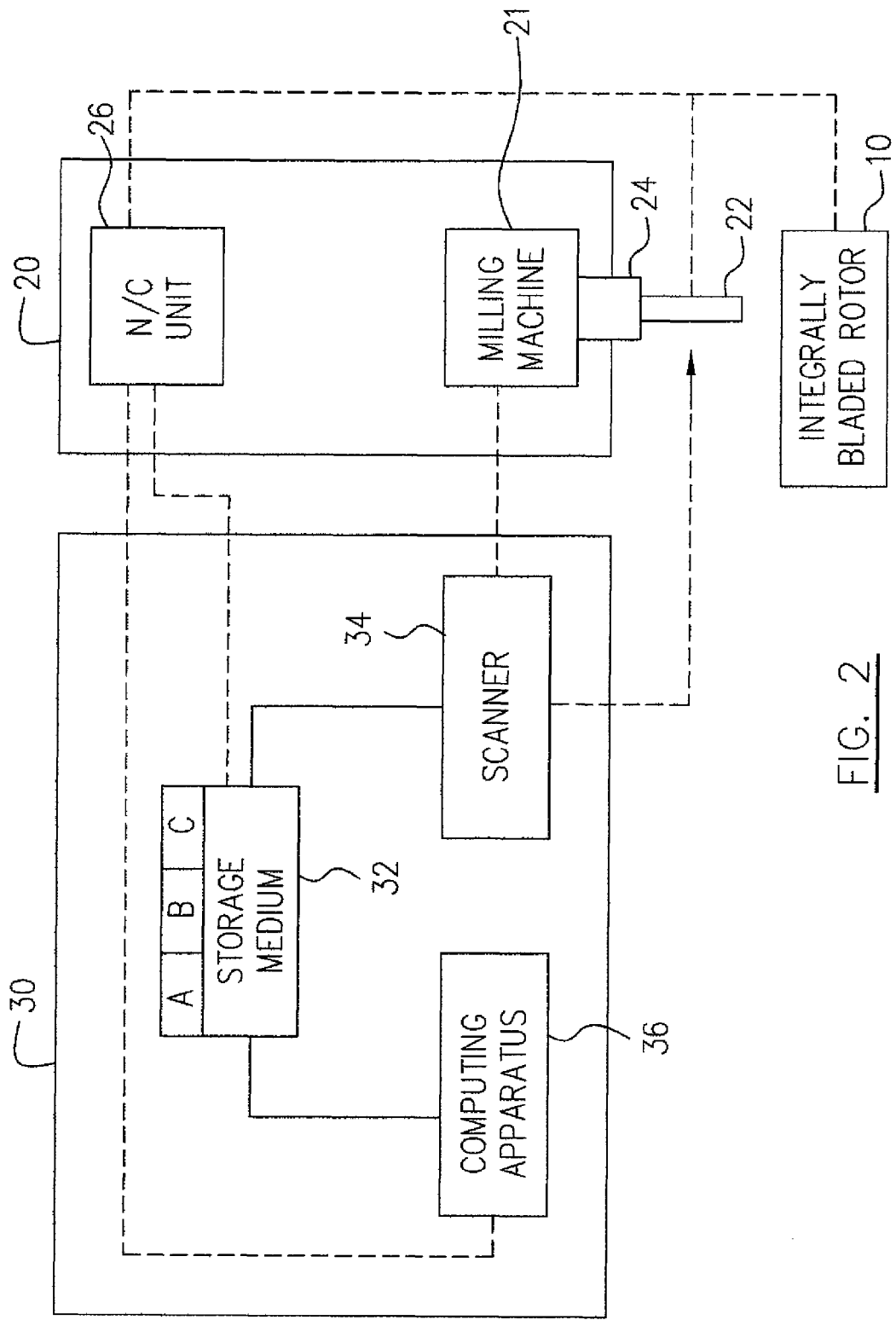
FIG. 2 is a schematic block diagram of a tool deflection prediction system in combination with a milling machine according to one embodiment.

Referring to FIGS. 1 and 2, the numerically-controlled machine tool 20 according to this embodiment includes a milling machine 21 and a numerically-controlled (N/C) unit 26 which includes a storage medium therein (not shown) storing data regarding tool-and-part engagement conditions such as machine spindle speed, machining feed rates, material properties of the particular airfoil part, such as that of bladed rotor 10. The numerical data regarding the nominal shape of the respective cutting tool 22 and airfoil part of the integrally bladed rotor 10, as well as the numerical coordinates of the position of the airfoil part of the integrally bladed rotor 10 relative to the milling machine 21, are also stored in the storage medium of the N/C unit 26. The N/C unit 26 is capable of controlling the cutting tool 22 of the milling machine 21 in a sequence of desired operational steps to provide a desired tool path based on the information stored in the storage medium and preset programs in the N/C unit 26.

The blades 14 are relatively long and machining of such long blades requires long cutting tools 22. The elongate cutting tool 22 has a relatively low bending stiffness and will deflect during machining operations under cutting forces. The deflections of the elongate cutting tool 22 will cause the actual tool path which forms the finishing surface of the blade to deviate from the programmed tool path which has been preset in the numerically-controlled machine tool 20. The tool deflection prediction system 30 according to one embodiment, is therefore provided to the numerically-controlled machine tool 20, to provide predicted tool deflection information (the predicted deflection of the elongate cutting tool 22) to the numerically-controlled machine tool 20 for modification of the preset programs therein, in order to calculate a more precise machining operation which will minimize variations and avoid significant mismatches among the finished blades 14.

Figure 3:
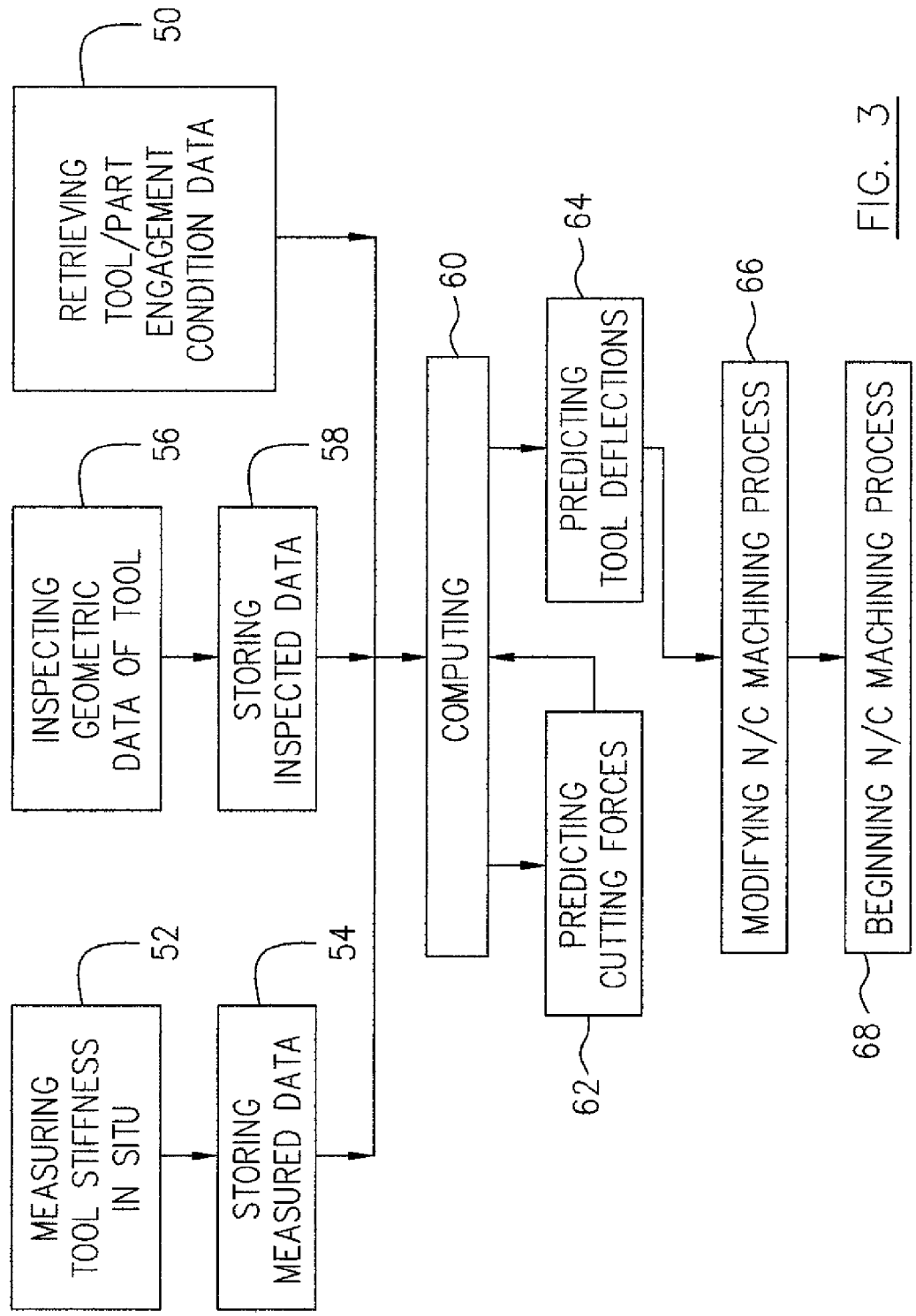
FIG. 3 is a schematic block diagram of a machining process employing the tool deflection prediction system of FIG. 2, with a tool path composition for predicted tool deflections according to one embodiment.

Reference is now made to FIGS. 2 and 3, the tool deflection prediction system 30 according to this embodiment includes a storage medium 32 containing data of static stiffness of the cutting tool 22 and data of given tool-and-part engagement conditions in the sequence of the desired operational steps. The latter may be retrieved from the storage medium of the N/C unit 26. The data of the above-described two types are represented by respective boxes A and B of the storage medium 32. The retrieval of tool-and-part engagement condition data is represented by block 50 of FIG. 3. Blocks 52 and 54 of FIG. 3 indicate that the static stiffness of the cutting tool 22 may be obtained by measuring the static stiffness of the cutting tool 22 when it is mounted on the spindle 24 of the milling machine 21 and then storing the measured data in the storage medium 32 of FIG. 2. The static stiffness may be defined as a value of the deviation per cutting force measured in a specific location of the cutting tool under specified conditions.

The tool deflection prediction system 30 may further include a scanner 34 which may be a 3-dimensional scanner, for example mounted on the milling machine 21. The scanner 34 or other measuring devices are used for inspecting the actual geometric parameters of the cutting tool 22 which is selected for use in the machining process, as represented by block 56 in FIG. 3. The scanner 34 is operatively connected to the storage medium 32 for sending data of the inspected actual geometric parameters of the cutting tool 22 to the storage medium 32 as represented by Box C of the storage unit 32. Bloc 58 of FIG. 3 represents such data storing step. The actual geometric parameters of the cutting tool 22 include, for example the actual diameter run-out which may be caused by lack of concentricity of individual cutting edges about the central axis of the cutting tool (also the rotating axis of the spindle 24 of the milling machine 21 when the cutting tool 22 is mounted thereon), unbalances which for example may be caused by asymmetries in the shape of the cutting tool 22, etc. These actual geometric parameters of the cutting tool 22 may be inspected immediately before the machining operation. The inspection of the actual geometric parameters of the cutting tool 22 may be performed before or after the cutting tool 22 is mounted on the spindle 24 of the milling machine 21.

The tool deflection prediction system 30 also includes a computing apparatus 36 which is used to predict cutting forces and static deflections of the cutting tool 22 during the sequence of desired operational steps, based on the data represented by boxes A, B and C in the storage medium 32 of FIG. 2, as represented by blocks 60, 62 and 64 in FIG. 3.

The predicted tool deflections of the cutting tool 22 are fed to the N/C unit 26 to for adjustment of the numerically-controlled machining process such that the tool path is modified to compensate for predicted tool deflections, as represented by block 66 in FIG. 3. The N/C unit 26 then generates a modified sequence of desired operational steps, adjusted for tool path compensation, thereby providing a more accurate desired tool cutting path resulting in the finished part being closer to the nominal profile thereof.

The numerically-controlled machining process 68 begins after the modification procedure represented by block 66 is complete.

The tool deflection prediction system 30 is used off-line to predict tool deflections of the cutting tool 22 for tool path composition used by the N/C unit 26 to modify the machining process performed by the milling machine 21. Therefore, the tool deflection prediction system 30 is simpler and less costly than conventional real time adaptive control systems used for numerically-controlled machine tools to modify a preset N/C sequence of desired operational steps in a machining operation. The predicted tool deflections according to the described embodiments are computed off-line with the static stiffness of the particular cutting tool 22 when mounted to the spindle 24 of the milling machine 21 and the predicted cutting forces which are calculated with reference to the actual geometric parameters of the particular cutting tool 22, immediately before the machining operation. Therefore, this input data for computing the predicted tool deflections closely simulates the data which could be obtained in real time during the machining process such that the predicted tool deflections are very close to the actual tool deflections of the cutting tool 22 during the machining process. As a result of using the predicted tool deflections to off-line modify the machining process, the dimensional variations and mismatches between the machined sections of the blades are minimized.

The above description is meant to be exemplary only, and one skilled in the art will recognize that changes may be made to the embodiments described without departure from the scope of the described subject matter. For example, a scanner such as a 3-dimensional scanner is described in one embodiment, but any other type of suitable measuring device may be used for inspecting the actual geometric parameters of the cutting tool. In the described embodiment, the machining operation is referred to as airfoils of an integrally bladed rotor of gas turbine engines. However, the described system and method may be applicable in machining operations of work parts of any other types. The cutting tool used in various machining processes may be different from that illustrated in the drawings. Still other modifications which fall within the scope of the described subject matter will be apparent to those skilled in the art, in light of a review of this disclosure, and such modifications are intended to fall within the appended claims.

The invention claimed is:

1. A method machining an airfoil part in a numerically-controlled machining process with a selected tool, the numerically-controlled machining process being based on given tool-and-part engagement conditions, the method comprising:
   a) inspecting actual geometric parameters of the selected tool;
   b) predicting cutting forces in a computing program based on the given tool-and-part engagement conditions and using the inspected actual geometric parameters of the selected tool as inputs;

c) predicting tool deflections under the predicted cutting forces based on a pre-measured static stiffness of the selected tool;

d) modifying a tool path of the numerically-controlled machining process to compensate for the predicted tool deflections; and e) machining the airfoil part to a desired profile by use of the selected tool to follow the modified tool path.

2. The method as defined in claim 1 wherein the selected tool is inspected immediately before every machining operation of a selected airfoil part.

3. The method as defined in claim 2 wherein the selected tool is inspected by a 3-dimensional scanner mounted on a machine performing the numerically controlled machining process.

4. The method as defined in claim 1 wherein the pre-measured static stiffness is measured when the selected tool is mounted to a spindle of a machine performing the numerically-controlled machining process.

5. The method as defined in claim 1 wherein the given tool-and-part engagement conditions comprise at least a pre-selected machine spindle speed, a pre-selected machining feed rate and material properties of the airfoil part.

6. The method as defined in claim 1 wherein the actual geometric parameters of the selected tool comprise at least a diameter of the tool, eccentricities of cutting edges about an central axis of the tool and asymmetries in tool shape.

7. The method as defined in claim 1 wherein steps a to d are performed in a process separate from step e.

8. An airfoil machining system having a numerically-controlled machine tool, the airfoil machining system comprising:

a storage medium containing data of a static stiffness of a cutting tool mounted on a spindle of the machine tool and data of given tool-and-part engagement conditions in the sequence of the desired operational steps;

a scanning apparatus for inspecting actual geometric parameters of the cutting tool, the scanning apparatus being operatively connected to the storage medium for sending data of the inspected actual geometric parameters of the cutting tool to the storage medium;

a computing apparatus capable of predicting cutting forces and tool deflections in a sequence of desired operational steps of the machine tool, based on the data stored in the storage medium; and a numerically-controlled unit capable of controlling the machine tool in the sequence of the desired operational steps to provide a desired tool path.

9. The system as defined in claim 8 wherein the computing apparatus is operatively connected to the numerically-controlled unit, allowing calculation of a tool path compensation for the predicted tool deflections in order to provide the desired tool path.

10. The system as defined in claim 8 wherein the scanning apparatus comprises a 3-dimensional scanner.

11. The system as defined in claim 8 wherein the scanning apparatus is mounted on the numerically-controlled machine tool.

12. The system as defined in claim 8 wherein the actual geometric parameters of the selected tool comprise at least a diameter of the tool, eccentricities of cutting edges about an central axis of the tool and asymmetries in tool shape.

13. The system as defined in claim 8 wherein the given tool-and-part engagement conditions comprise at least a pre-selected machine spindle speed, a pre-selected machining feed rate and material properties of a work part to be machined.

\* \* \* \* \*